US011864604B2

(12) United States Patent
Avasarala et al.

(10) Patent No.: US 11,864,604 B2
(45) Date of Patent: Jan. 9, 2024

(54) FACE MASK AND SHIELD COMBINATION

(71) Applicant: Aver Technologies, Inc., Woodbridge, VA (US)

(72) Inventors: Pallavi Avasarala, Woodbridge, VA (US); Pranav Avasarala, Woodbridge, VA (US)

(73) Assignee: Aver Technologies, Inc., Woodbridge, VA (US)

( * ) Notice: Subject to any disclaimer, the term of this patent is extended or adjusted under 35 U.S.C. 154(b) by 284 days.

(21) Appl. No.: 17/404,306

(22) Filed: Aug. 17, 2021

(65) Prior Publication Data

US 2022/0346474 A1 Nov. 3, 2022

Related U.S. Application Data

(63) Continuation of application No. 17/245,365, filed on Apr. 30, 2021, now Pat. No. 11,109,625.

(51) Int. Cl.
*A41D 13/11* (2006.01)
*A62B 18/02* (2006.01)
*A62B 18/08* (2006.01)

(52) U.S. Cl.
CPC ...... *A41D 13/1184* (2013.01); *A41D 13/1138* (2013.01); *A62B 18/025* (2013.01); *A62B 18/08* (2013.01)

(58) Field of Classification Search
CPC ....... A62B 18/02; A62B 18/025; A62B 18/10; A41D 13/1138; A41D 13/1184
See application file for complete search history.

(56) References Cited

U.S. PATENT DOCUMENTS 403,966 A * 5/1889 Smith .................... A62B 18/10 128/206.15
1,701,277 A * 2/1929 Shindel .................. F16K 15/16 128/207.12
2,578,621 A * 12/1951 Yant .................... A62B 18/025 128/206.24
D188,021 S * 5/1960 Fisher .......................... D29/110
3,528,415 A * 9/1970 Malmin ................ A41D 13/11 128/202.13

(Continued)

FOREIGN PATENT DOCUMENTS

EP 2191736 A2 6/2010
GB 117979 A * 8/1918

(Continued)

OTHER PUBLICATIONS

Communication Relating to the Results of the Partial International Search issued in International Application No. PCT/US2022/026897, dated Aug. 2, 2022 (13 pages).

(Continued)

*Primary Examiner* — Kathryn E Ditmer
(74) *Attorney, Agent, or Firm* — Bookoff McAndrews, PLLC

(57) ABSTRACT

A wearable face covering may include a mask including a filter and a cap, wherein the cap is configured to prevent any gas passing through the filter in a first direction from exiting the mask in the first direction; and a face shield including a partially-transparent screen, wherein the face shield is pivotally coupled to the mask.

20 Claims, 10 Drawing Sheets

(56) References Cited

U.S. PATENT DOCUMENTS

| | | | | | |
|---|---|---|---|---|---|
| 4,250,577 | A * | 2/1981 | Smith | A62B 18/084 | 2/427 |
| D335,723 | S * | 5/1993 | Pawliszyn | A41D 13/1184 | D29/110 |
| 5,372,130 | A * | 12/1994 | Stern | A62B 18/006 | 128/206.17 |
| 5,689,833 | A * | 11/1997 | Allen | A62B 18/08 | 2/427 |
| 6,216,695 | B1 | 4/2001 | Ruben | | |
| 6,460,539 | B1 * | 10/2002 | Japuntich | A62B 18/10 | 128/205.12 |
| 10,945,469 | B1 | 3/2021 | Rosenberg et al. | | |
| 2004/0069302 | A1 * | 4/2004 | Wilson | A41D 13/1184 | 128/201.24 |
| 2007/0101990 | A1 * | 5/2007 | Hacke | A61M 16/06 | 128/201.25 |
| 2011/0036347 | A1 * | 2/2011 | Morgan, III | A62B 18/025 | 128/201.19 |
| 2012/0090619 | A1 * | 4/2012 | Levine | A61M 16/044 | 128/207.15 |
| 2017/0021203 | A1 * | 1/2017 | Baker | A62B 7/12 | |
| 2018/0185677 | A1 * | 7/2018 | Curran | A62B 9/02 | |
| 2020/0289859 | A1 * | 9/2020 | Malloy | A62B 18/084 | |

FOREIGN PATENT DOCUMENTS

| | | | | |
|---|---|---|---|---|
| GB | 2354450 | A * | 3/2001 | A62B 18/08 |
| GB | 2354450 | A | 8/2003 | |
| WO | 9634658 | A1 | 11/1996 | |
| WO | 2019104584 | A1 | 6/2019 | |
| WO | WO-2019104584 | A1 * | 6/2019 | A62B 18/10 |

OTHER PUBLICATIONS

Funbotics, "Funbotic Mask Filter Replacement Instructions", info@funbotics.org, 2 pages.

* cited by examiner

FACE MASK AND SHIELD COMBINATION

CROSS-REFERENCE TO RELATED APPLICATION(S)

This application is a continuation of U.S. patent application Ser. No. 17/245,365, filed Apr. 30, 2021, now U.S. Pat. No. 11,109,625, issued Sep. 7, 2021, which is incorporated by reference herein in its entirety.

TECHNICAL FIELD

Aspects of this disclosure relate generally to protection systems, devices, and methods. More specifically, embodiments of the disclosure relate to a protection system (e.g., combined face mask and shield) for directing and/or filtering air and/or particulates being inhaled and/or exhaled by a user. The combined face mask and shield may be useful in the medical field, in the construction field, or in any other suitable field requiring face protection.

BACKGROUND

Protection devices such as face masks, face shields, and the like are worn by a user in many fields (e.g., medical, construction, etc.) to help protect the user from air particulates, including, for example, dust, bacteria, viruses, allergens, spores, coarse particles, debris, etc. A mask helps to protect a user from air particulates by surrounding a user's mouth and nose and filtering air that is inhaled. For example, the mask may be a cloth or other material that covers the user's mouth and nose. However, during exhalation, the exhaled air remains within the confines of the mask, or a portion of the exhaled air is directed forward of the user. Shields are worn to help protect a portion of a user's face from air particulates. Shields often include a band that wraps around the user's head such that the shield extends in front the user's face. The shield helps to protect the user's eyes and face from air particulates or debris. Shields also are rigid and/or fixed relative to the user's face, which requires the user to completely remove the shield to access the user's face, for example, to adjust the user's glasses. Additionally, as the user exhales, the shield becomes foggy, which impairing the user's eyesight. Even if the user is wearing a mask, the shield still becomes foggy since the exhaled air exits the front of the mask. Additionally, the shield moves and/or separates from the user's head when attached by a single band around the user's head. Masks also move and/or separate from the user's face, for example, when the user adjusts the attachment strap(s), talks, moves the user's mouth, etc. Furthermore, wearing both a shield and mask concurrently is time-consuming and/or difficult to adjust, manipulate, etc.

The systems, devices, and methods of the current disclosure may address one or more of the deficiencies described above.

SUMMARY

Examples of the present disclosure relate to, among other things, wearable face coverings (e.g., combined mask and face shield assemblies), devices, and methods to help direct and/or filter air and/or air particulates being inhaled and/or exhaled by a user while also protecting the user's face from debris. In one example, the combined mask and shield may protect the wearer's face from flying objects at constructions sites (e.g., chipped concrete) and also protect the user from inhaling dust. In some examples, the face shield or screen may be shatter-proof or otherwise shatter-resistant. Each of the examples disclosed herein may include one or more of the features described in connection with any of the other disclosed examples.

In one example, a wearable face covering, may include a mask, wherein the mask includes: a base with a first central opening, the base including an interior side at least partially enclosing an interior volume, and an exterior side; an adapter including a flange and a coupling surface, the flange and coupling surface surrounding a second central opening, wherein the flange abuts the interior side of the base, and the coupling surface extends through the first central opening of the base, wherein the coupling surface includes at least one first slot in fluid communication with second central opening, wherein the at least one first slot has a portion that is substantially perpendicular to the second central opening, wherein the coupling surface also includes an interior recessed area; a filter removably disposed in the interior recessed area of the adapter; a face shield including a partially-transparent screen; a coupler including a flange, a venting surface surrounding a third central opening, and at least one second slot on the venting surface, wherein the second flange removably abuts the exterior side of the base, wherein the face shield is connected to the coupler and also configured to pivot relative to the coupler; and a cap removably engageable with the adapter, wherein the cap is configured to prevent any gas passing through the filter in a first direction from exiting the mask in the first direction.

The wearable face covering may direct any gas travelling from the interior volume of the base through the first central opening and through the second central opening before exiting the mask. The wearable face covering may direct any gas travelling from the interior volume of the base through the first central opening and through the third central opening before exiting the mask. The wearable face covering may direct any gas travelling from the interior volume of the base through the first central opening and through at least one first slot and at least one second slot before exiting the mask.

The wearable face covering may include a cap including a center portion that is received by the third central opening of the coupler, wherein the center portion includes one or more openings, wherein any gas travelling from the interior volume of the base through the first central opening, must pass through the one or more openings before exiting the mask.

The wearable face covering may include a face shield configured to pivot relative to the coupler and relative to the mask about a pivot axis disposed below the base of the mask. The face shield may be in a first position, wherein a majority of a longest dimension of the screen is disposed above the mask, wherein in the first position, a line extending through the first central opening and parallel to the first central opening, extends through the screen. The face shield may be in a second position, wherein a majority of the longest dimension of the screen is disposed below the mask, wherein in the second position, the line extending through the first central opening and parallel to the first central opening, does not extend through the screen.

The wearable face covering wherein the cap includes a first protrusion and the adapter includes a first key slot configured to receive the first protrusion, wherein the key slot is substantially parallel to a central longitudinal axis, and wherein, while the first protrusion is disposed within the first key slot, the cap and the adapter are rotationally fixed relative to one another. The first key slot connects to one of the at least one first slot of the adapter, wherein after the first protrusion has traversed the entirety of the first key slot and is disposed with a first slot, the cap and the adapter are configured to rotate relative to one another.

The wearable face covering may include a light source mounted to an exterior of the face shield.

The wearable face covering may include a porous disk disposed between the filter and the adapter, wherein the porous disk is configured to secure the filter into the adapter. The adapter includes two first slots, wherein the two first slots are arranged vertically in the adapter and are parallel to one another.

The wearable face covering may include the coupler including two second slots, wherein the two second slots are arranged vertically in the adapter and are parallel to one another.

An entirety of the wearable face shield may be secured to a user without any direct attachment to a head of the user.

In another example, a wearable face covering may include a mask including, a base with a first central opening, the base including an interior side at least partially enclosing an interior volume, and an exterior side; an adapter including a flange and a coupling surface, the flange and coupling surface surrounding a second central opening, wherein the flange abuts the interior side of the base, and the coupling surface extends through the first central opening of the base, wherein the coupling surface includes at least one first slot in fluid communication with second central opening, wherein the at least one first slot has a portion that is substantially perpendicular to the second central opening, wherein the coupling surface also includes an interior recessed area; a filter removably disposed in the interior recessed area of the adapter; a face shield including a partially-transparent screen; a coupler including a flange, a venting surface surrounding a third central opening, and at least one second slot on the venting surface, wherein the second flange removably abuts the exterior side of the base, wherein the face shield is connected to the coupler and also configured to pivot relative to the coupler and relative to the mask about a pivot axis disposed below the base of the mask; and a cap removably engageable with the adapter, wherein the cap is configured to prevent any gas passing through the filter in a first direction from exiting the mask in the first direction, wherein the cap includes a center portion that is received by the third central opening of the coupler, wherein the center portion includes one or more openings, wherein: any gas travelling from the interior volume of the base through the first central opening, must pass through the second central opening, the third central opening, at least one first slot, at least one second slot, and the one or more openings of the cap, before exiting the mask; and an entirety of the face shield is configured to be secured to a user without any direct attachment to a head of the user. The face shield may be in a first position, wherein a majority of a longest dimension of the screen is disposed above the mask, wherein in the first position, a line extending through the first central opening and parallel to the first central opening, extends through the screen; when the face shield is in a second position, a majority of the longest dimension of the screen is disposed below the mask, wherein in the second position, the line extending through the first central opening and parallel to the first central opening, does not extend through the screen.

The wearable face covering may include a cap including a first protrusion and an adapter including a first key slot configured to receive the first protrusion, wherein the key slot is substantially parallel to a central longitudinal axis, and wherein, while the first protrusion is disposed within the first key slot, the cap and the adapter are rotationally fixed relative to one another; and the first key slot connects to one of the at least one first slot of the adapter, wherein after the first protrusion has traversed the entirety of the first key slot and is disposed with a first slot, the cap and the adapter are configured to rotate relative to one another. The adapter may include two first slots, wherein the two first slots are arranged vertically in the adapter and are parallel to one another; and the coupler may include two second slots, wherein the two second slots are arranged vertically in the adapter and are parallel to one another.

In another example, a wearable face covering may include a mask including a filter and a cap, wherein the cap is configured to prevent any gas passing through the filter in a first direction from exiting the mask in the first direction; and a face shield including a partially-transparent screen, wherein the face shield is pivotally coupled to the mask.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary features of the present disclosure and together with the description, serve to explain the principles of the disclosure.

DETAILED DESCRIPTION

Embodiments of the present disclosure may relate to a protection system for directing and/or filtering air and/or particulates being inhaled and/or exhaled by a user. Various embodiments described herein may include a protection system that includes a mask and a shield. For example, the mask may be a face mask, and the shield may be a face shield. More specifically, in exemplary embodiments, the protection system may include a combined mask and shield, and may be configured to direct outward airflow rearward, for example, away from the shield. The airflow may be directed rearward, for example, by one or more vented slots and a cap.

Figure 1:
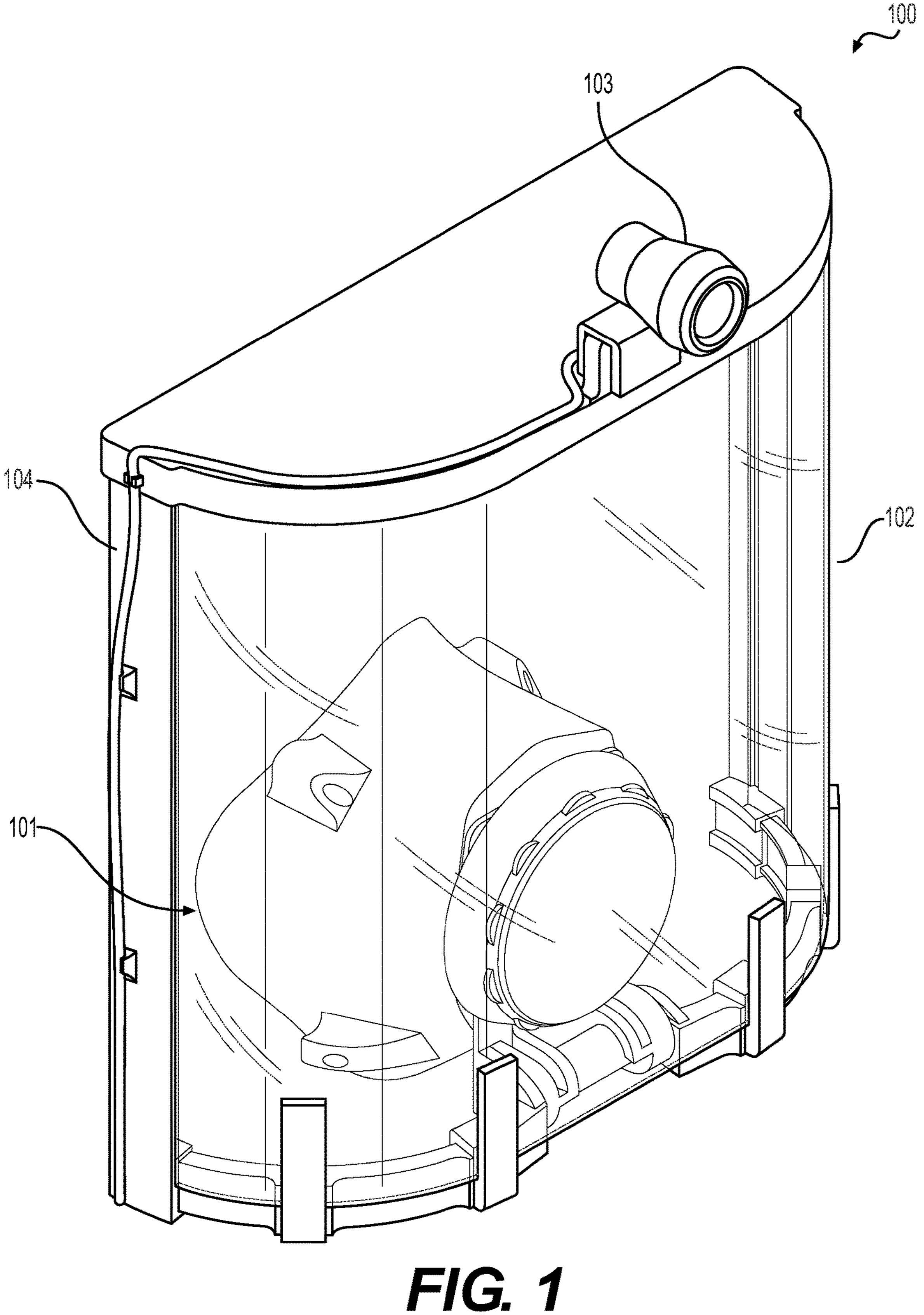
FIG. 1 illustrates an exemplary protection system/wearable face covering including a mask and a shield in an assembled configuration, according to an embodiment of the disclosure.
Figure 2:
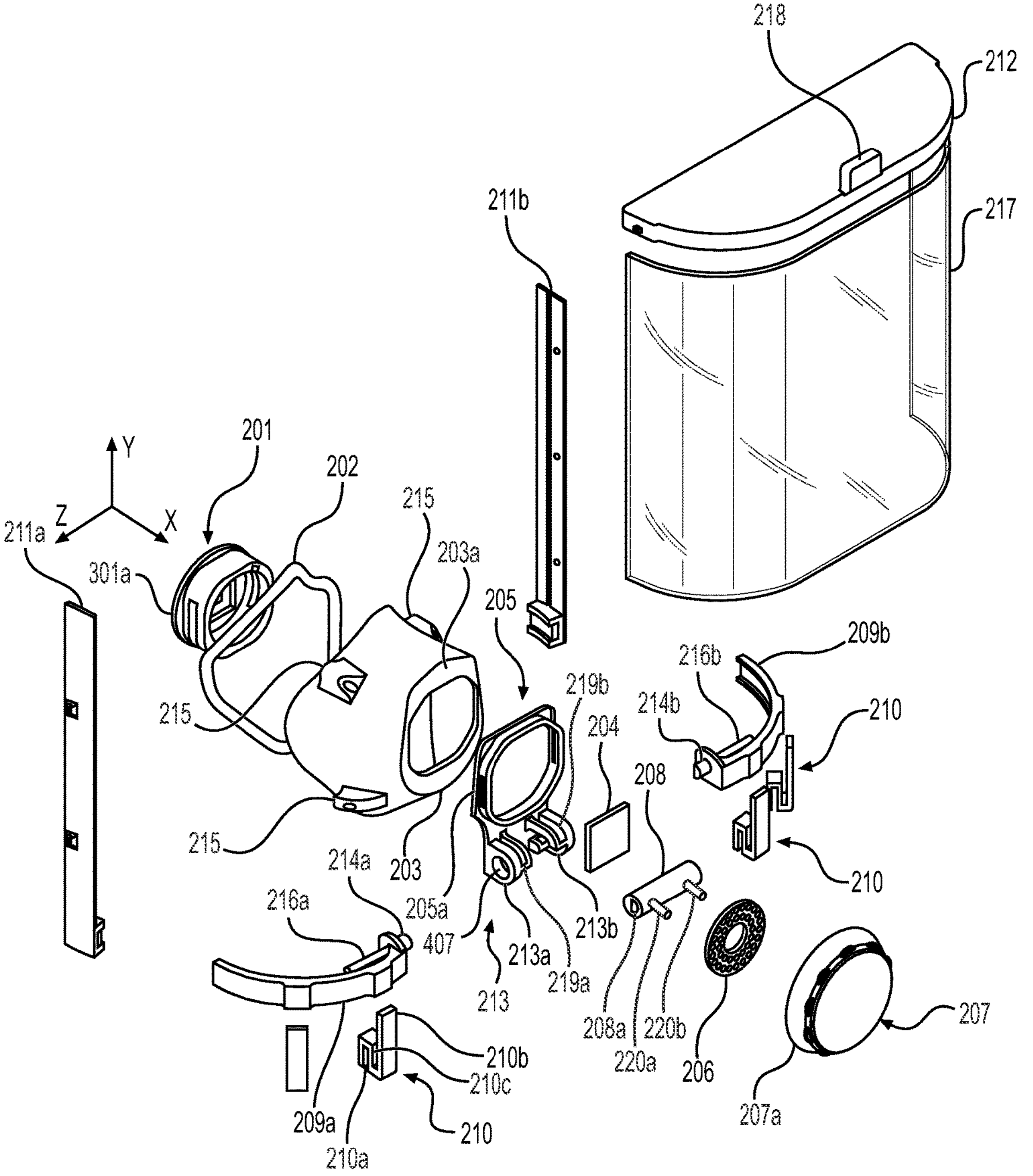
FIG. 2 illustrates an exploded view of the components of the protection system of FIG. 1.
Figure 2A:
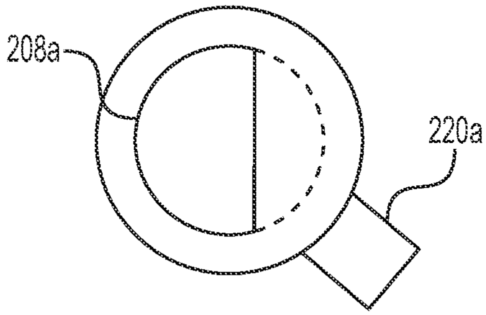
FIG. 2A shows a side view of an exemplary linking rod.
Figure 2B:
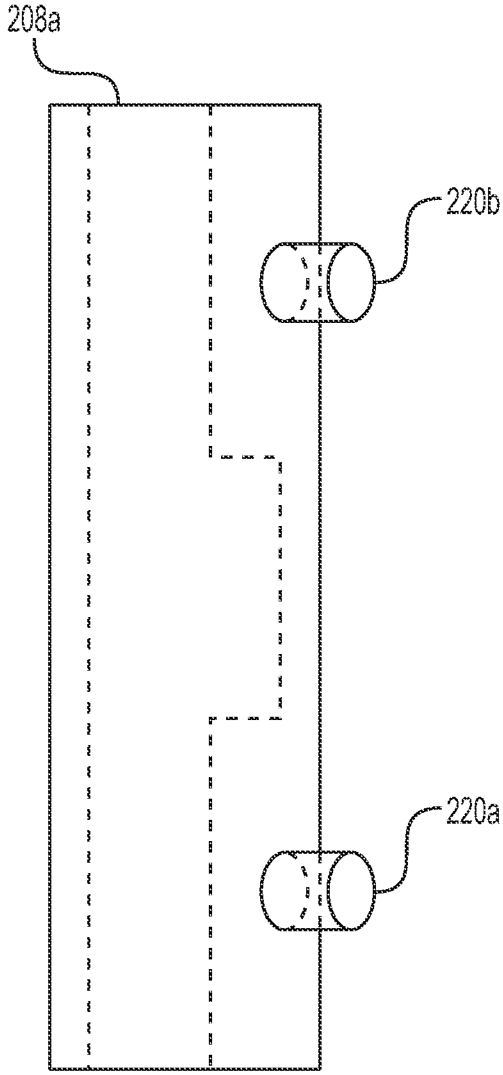
FIG. 2B shows a partial cross-sectional view of the linking rod of FIG. 2A.

FIGS. 1 and 2 depict a protection system 100 that includes a mask 101 and a shield 102. Protection system 100 may help protect a user's face from outside air particulates (e.g., dust, bacteria, viruses, allergens, spores, coarse particles, etc.) and/or other debris. FIG. 1 illustrates protection system 100 in an assembled configuration. As shown, mask 101 and shield 102 may be coupled together, for example, with a mask and shield attachment or a coupler 205. Additionally, coupler 205 may pivotally couple mask 101 and shield 102, for example, allowing for shield 102 to pivot relative to mask 101, as shown in FIG. 6C.

Mask

Figure 4A:
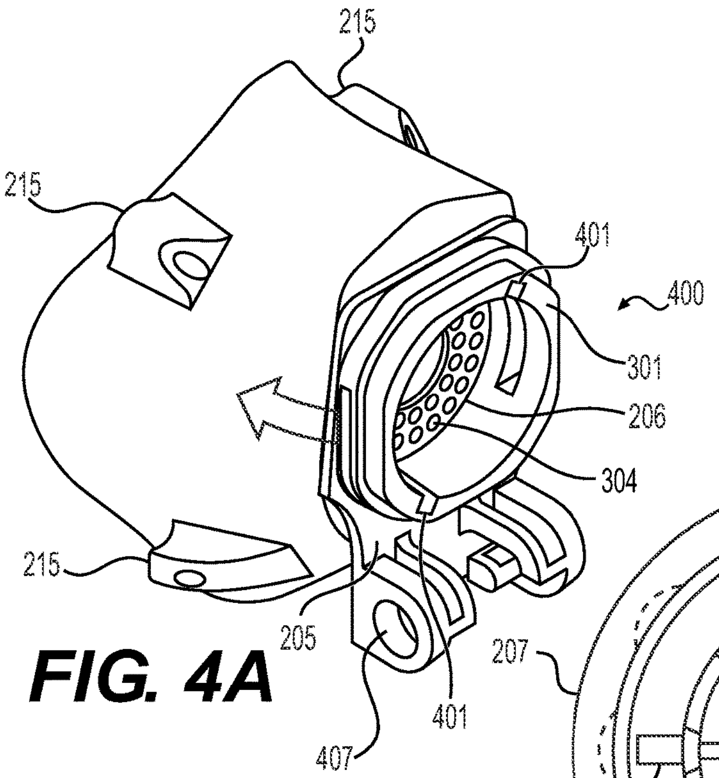
FIG. 4A illustrates a perspective view of portions of the mask assembled.
Figure 4B:
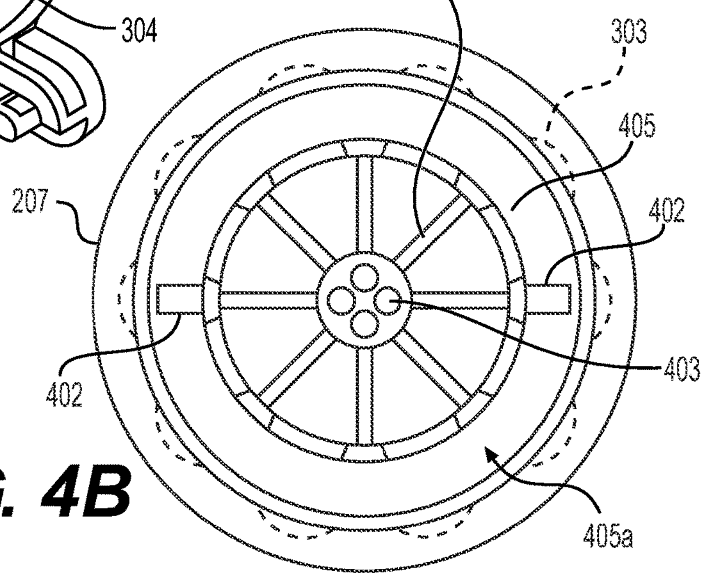
FIG. 4B illustrates an end view of an inside of a cap.
Figure 4C:
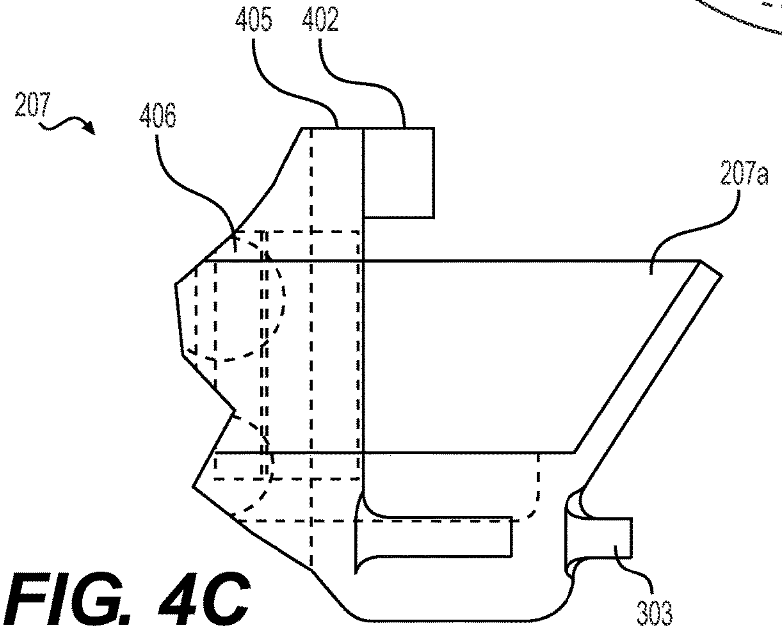
FIG. 4C illustrates a detailed section view the cap of 4C.

Referring to FIG. 2, mask 101 may be an at least partially flexible filtration mask, for example, to form a seal around at least a portion of a user's nose and face. Mask 101 may include a disk or a cap 207 to help direct airflow. In one or more aspects, cap 207 may help to direct air rearwards and/or away from shield 102 when the user exhales. Cap 207 may direct exhaled air rearward and help to prevent exhaled air from passing forward of the user's face. As shown in FIG. 4B, cap 207 may also include one or more openings 403 positioned centrally within the cap 207, for example, to allow airflow in through sides of mask 101 during an inhale of the user.

Figure 3:
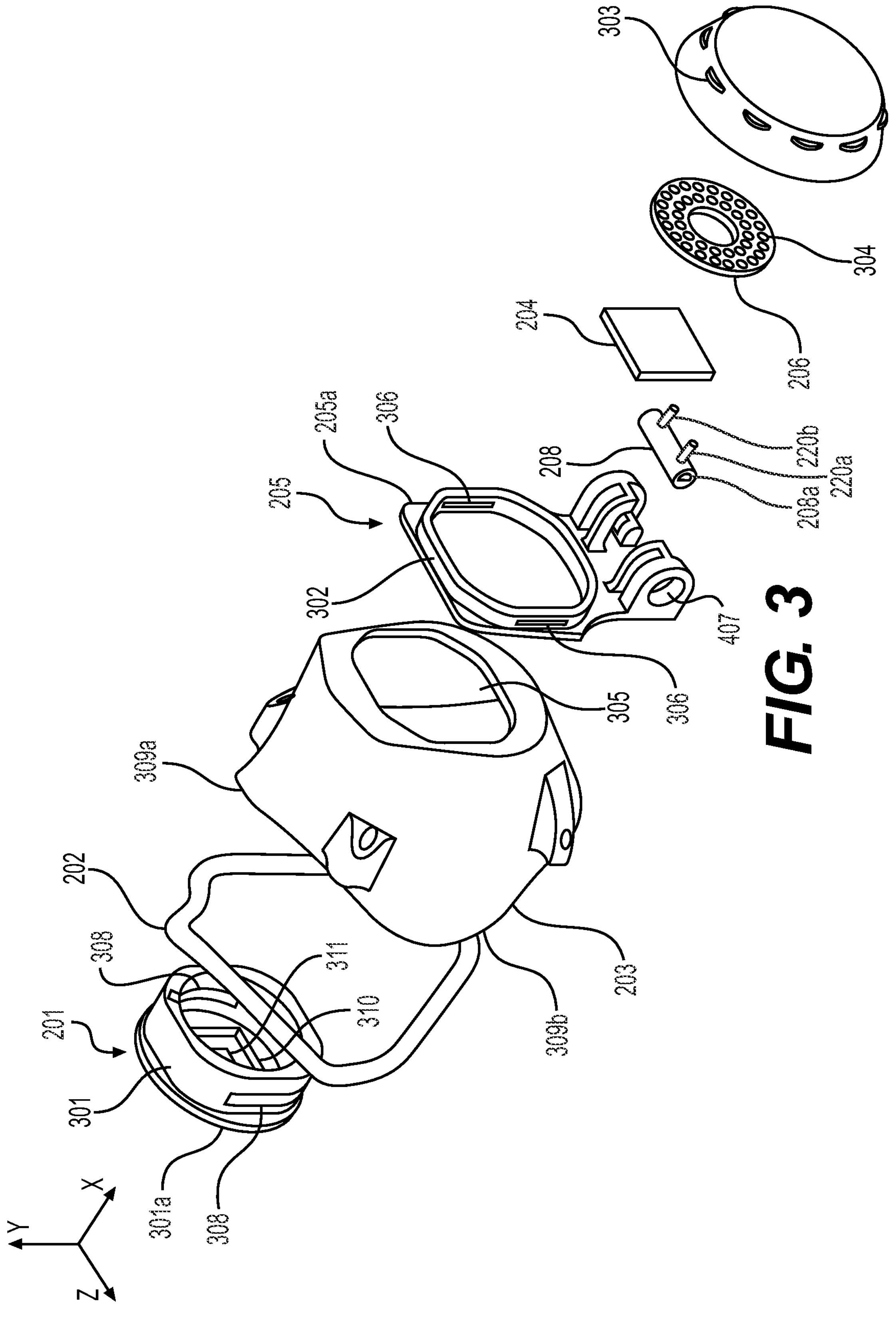
FIG. 3 illustrates an exploded view of the mask.

As discussed in detail below, mask 101 may be formed of a number of components or elements fitted or otherwise coupled together. For example, mask 101 may include a base 203 and cap 207. Furthermore, coupler 205 may help to form mask 101. Base 203 may include an interior at least partially enclosing an interior volume, and an exterior. Base 203 may be configured to fit around a user's mouth and nose. For example, as shown in FIGS. 2 and 3, base 203 may include a partially circular portion 309B, for example, to surround a user's mouth, and an extension portion 309A, for example, to surround a user's nose. In this aspect, partially circular portion 309B and extension portion 309A may surround a user's mouth and nose when the user wears mask 101. Base 203 may be coupled to coupler 205 via one or more of an adhesive, a snap fit, a press fit, etc. Furthermore, base 203 may include a plurality of retention holes 215. Retention holes 215 may allow for one or more retention elements (not shown) to be positioned around the user's head, ears, face, etc. to help couple mask 101 to the user's face. Retention elements, not shown, may include one or more strings, bands (e.g., an elastic band), straps, threaded knobs, etc. Base 203, for example, may include one or more retention holes 215 on each lateral side of base 203. As shown in FIGS. 1-5, base 203 may include two retention holes 215 on each lateral side of base 203. Although only one side of base 203 is shown in these figures, it is noted that the other side of base 203 may also include two retention holes 215. In these aspects, one or more retention elements, not shown, may pass through each of retention holes 215, and be secured to base 203, for example, via one or more knots, one or more clips, one or more adjustable buckles, etc. Retention element(s), not shown, may then be positioned around the user's head, ears, face, etc. to help couple mask 101 to the user's face.

Cap 207 may be coupled to one or more other components of mask 101. As discussed with respect to FIGS. 4A and 4B, cap 207 may be coupled to one or more components of mask 101 via a screw-fit. For example, cap 207 may include one or more keys 402 (FIG. 4B) positioned on an inner portion of cap 207, and the one or more keys 402 may be received within corresponding keyways. Cap 207 may also include a plurality of grips 303 positioned on an outer portion of cap 207. Coupling cap 207 to one or more other components of mask 101 may help retain mask 101 and/or protection system 100 in the assembled configuration.

As shown in FIGS. 2 and 3, mask 101 may further include an adapter 201, a filter 204, a seal 202, and a mask disk 206. Adapter 201 may include a coupling portion 301 that extends from a front of adapter 201. Adapter 201 may be inserted from an interior side of base 203, through a central opening 305 so that coupling portion 301 extends outward of base 203. Adapter 201 may include a flange 301*a* extending circumferentially around adapter 201. Flange 301*a* may be a portion of adapter 201 that is closest to a face of the user when the mask is worn, and may abut an inner surface of base 203 to help retain adapter 201 to base 203.

Coupling portion 301 may include an exterior with a shape that is different from that of its interior. The exterior may be substantially octagonal, and the interior may be substantially circular. As shown in FIGS. 2 and 3, the exterior may include alternating rounded portions and straight portions. Central opening 305 of base 203 may have a shape corresponding to the shape of the exterior of coupling portion 301.

Coupling portion 301 may include one or more vertical slots 308, for example, to allow air to flow into and out of mask 101. Slots 308 may be positioned on opposing sides of coupling portion 301. For example, slots 308 may extend from opposing vertical portions (e.g., opposing straight portions) of the exterior of coupling portion 301. Slots 308 may be formed by substantially rectangular openings (vents) extending in the vertical direction of side portions of coupling portion 301. Although a rectangular shape is shown, the shape of slots 308 should not be considered limited, and other suitable shapes, such as ovular, circular, square or the like also are contemplated. Slots 308 on sides of adapter 201 may help to direct airflow, for example, as air is drawn into mask 101 during inhalation and/or as air is pushed out of mask 101 during exhalation. For example, slots 308 may allow for mask 101 to draw air in from the sides of adapter 201 and/or direct air out of the sides of adapter 201 (e.g., in the positive and negative directions of the z-direction). In these aspects, the air passing through slot(s) 308 may be directed toward (e.g., when exhaled) and/or have passed through (e.g., when inhaled) filter 204.

Adapter 201 may also contain indented recessed portion 310, for example, in a center of adapter 201, which faces outward and away from the user. Recessed portion 310 may be any shape suitable of containing and/or receiving a portion of a filter 204. For example, if filter 204 is square or rectangular (as shown, then indented portion 310 may also be square or rectangular. Furthermore, adapter 201 includes an adapter opening 311 also at the center of the adapter and extending through recessed portion 310, and also extending in the x-direction. In this aspect, filter 204 may be received in recessed portion 310 so that air flowing through adapter opening 311 must pass through filter 204. Accordingly, during inhalation, air must pass through filter 204 and through adapter opening 311 to the user. Similarly, during exhalation, air must pass through adapter opening 311 and filter from the user.

Although not shown, if filter 204 is substantially circular, then indented portion 310 may also be substantially circular. Filter 204 may be configured to filter air particulates from air passing through filter 204, for example, during inhalation and exhalation. As discussed below, filter 204 may be a replaceable and/or reusable filter. Filter 204 may be replaced, for example, by removing cap 207.

Seal 202 may be coupled to an interior periphery of base 203. Seal 202 and other components of mask 101 may help to ensure that air flowing to and/or from the user's face (e.g., the user's mouth and nose) passes through filter 204.

As mentioned above, coupler 205 is positioned between base 203 and cap 207. Coupler 205 may have a venting portion 302 thereon extending in the x direction. Venting portion 302 may include venting slots 306 on opposing sides of the venting portion 302. When mask 101 is assembled, each slot 306 may align with a slot 308 of adapter 201, so that inhaled/exhaled air travelling through a given slot 306 must also travel through an immediately adjacent slot 308 and vice versa.

Coupler 205 may be coupled to base 203, for example, by press fit when cap 207 is coupled to adapter 201. For example, coupler 205 may include an abutting portion/flange 205*a* that abuts an outward face 203*a* of base 203. Coupler 205 may be in contact with coupling portion 301 of adapter 201, when coupling portion 301 extends through base 203. For example, coupler 205 may receive a portion of coupling portion 301 of adapter 201, and a portion of coupling portion 301 may extend distally beyond coupler 205, for example, farther from the user in the positive x-direction. The exterior of coupling portion 301 may contact an interior face of venting portion 302. Venting portion 302 may have an inner shape substantially similar to the exterior shape of coupling portion 302. For example, inner shape of venting portion 302 may correspond to the alternating straight and rounded portions of the exterior of coupling portion 302. Additionally, as discussed below, coupler 205 may also include a shield mounting portion 213, for example, extending from a bottom portion of venting portion 302. Shield mounting portion 213 may be coupled to a linking rod 208, for example, to pivotably support shield 102.

As shown in FIGS. 2 and 3, disk 206 may be configured to fit within coupling portion 301 of adapter 201. In this aspect, if coupling portion 301 has a substantially circular interior shape, mask disk 206 may also be substantially circular. As shown in FIG. 4A, disk 206 may be positioned within coupling portion 301, for example, in a position distal to (i.e., in the positive x-direction relative to) filter 204. Disk 206 may help to retain filter 204 relative to adapter 201, for example, such that filter 204 is retained at least partially within recessed portion 310. Filter 204 may be positioned and configured to prevent rotation of the filter while cap 207 rotates. Disk 206 may include a plurality of through-holes 304. Through-holes 304 may allow for air to flow through disk 206, and thus through filter 204, during inhalation and exhalation.

Securing cap 207 to adapter 201 may help retain filter 204 and disk 206 within the mask assembly. As mentioned above and as shown in FIGS. 4B and 4C, cap 207 may include one or more keys 402. One or more keys 402 may extend from an outer ring 404 of a central portion of cap 207. The central portion may include an inner ring 405 with a central hub 405*a*. Central hub 405*a* may include one or more channels 403. The channels 403 are in fluid communication with a plurality of conduits 406 that extend radially outward from the central hub. The conduits 406 terminate at an outer circumference of inner ring 405. In the assembled configuration inner ring 405 is received within the interior of adapter 201. Therefore, exhaled air from the user travels through the one or more openings 403, then through the one or more conduits 406, and then through slots 308 and 306, into the atmosphere.

Furthermore, the interior of coupling portion 301 may include one or more key slots 401, which extend in the x direction and which are coupled to slots 308. Key slots 401 (and slots 308) may receive a portion of cap 207 to help secure the mask assembly together. Key slots 401 may each include a longitudinal portion extending in the x direction that connect to slots 308. Key slots 401 may be positioned approximately 180 degrees apart from one another in the interior of coupling portion 301. In order to couple cap 207 to coupling portion 301 of adapter 201, keys 402 of cap 207 may be aligned with key slots 401. Cap 207 may be advanced longitudinally, for example, in the negative x-direction, which may also advance keys 402 longitudinally within key slots 401. Cap 207 may then be rotated after keys 402 are prevented from further longitudinal movement, for example, clockwise, which may rotate keys 402 into slots 308. After this rotation, cap 207 may be secured to adapter 201, further securing base 203, coupler 205, filter 204, and disk 206 in between cap 207 and adapter 201.

Figure 5:
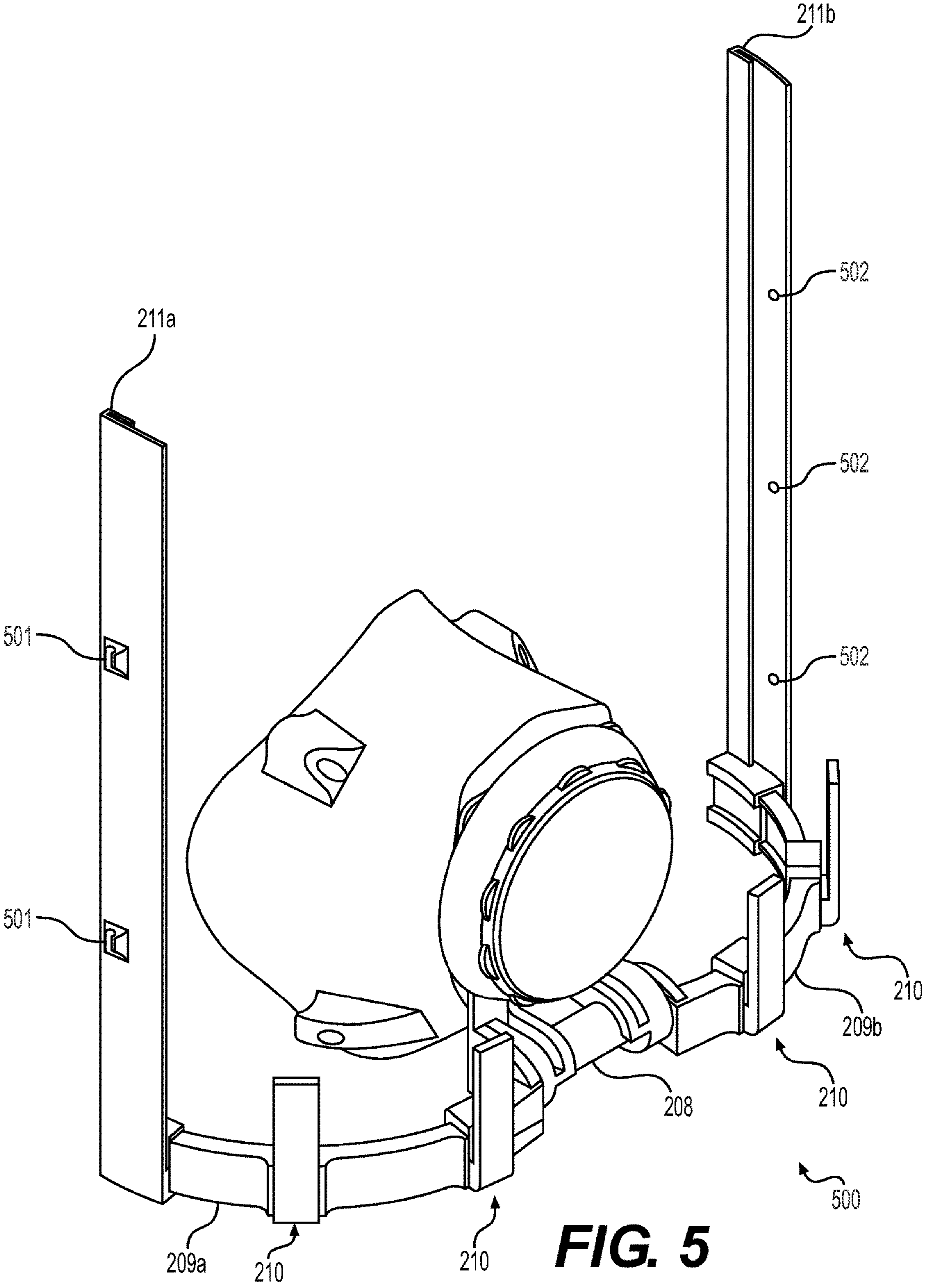
FIG. 5 illustrates a perspective view of the protection system in a partially assembled configuration.

Thus, coupling cap 207 to adapter 201 may help to couple the other components of mask 101. For example, as shown in FIG. 5, coupling cap 207 to adapter 201 may help to form a clamped assembly. Furthermore, when cap 207 is coupled to coupling portion 302 of adapter 201, cap 207 directs exhaled air back toward the user's ears, instead of in the forward direction. In some embodiments, cap 207 is configured to substantially or entirely prevent the flow of exhaled air from travelling in the forward direction (away from the user). Cap 207 may achieve this result by virtue of a closed front end (without any holes, openings, or gaps, extending through its front surface. Furthermore, cap 207 may include a conical skirt 207*a* that further diverts air exhaled through slots 306 and 308 rearward toward the user's ears and face. In some embodiments, air exiting mask 101 does not include any component travelling in the forward/positive X direction.

Moreover, cap 207 may be removable, for example, to access filter 204. With cap 207 separated from adapter 201, the user may access disk 206 and/or filter 204, for example, to adjust, inspect, clean, replace, etc. either disk 206 and/or filter 204.

As mentioned above, FIG. 4A depicts mask 101 in a partially assembled configuration. As shown, when adapter 201 and coupler 205 are coupled, slots 308 of adapter 201 and venting slots 306 of coupler 205 are at least partially aligned. Although only one side of assembled mask 101 is shown in figures, it is noted that both sides of adapter 201 and coupler 205 may have slots 308 and venting slots 306 aligned. For example, aligning the slots 308 with venting slots 306 may allow air to flow from exterior of mask 101 to an interior of mask 101 and to filter 204, for example, as the user inhales. For example, aligning the slots 308 with venting slots 306 may allow air to flow from inside mask 101 to filter 204 and out of mask 101 via the aligned slots 308 and venting slots 306, for example, as the user exhales.

Shield

Referring back to FIGS. 1 and 2, shield 102 may surround at least a portion of mask 101. For example, shield 102 may include a front portion and one or more curved portions, to at least partially surround the front and/or sides of the user's face. Shield 102 may also include an extension 212, for example, extending from a top edge of shield 102. One or more lights 103 may be coupled to shield 102 and/or extension 212, and light 103 may be connected to one or more wires 104. While extension 212 is shown having a flat line surface disposed closes to a user, one of skill in the art will appreciate that this surface could be curved to accommodate the contours of the user's forehead. In some embodiments, the shield 102 may be secured and worn by the user without any direct attachment or coupling of the shield to a forehead or head of the user. Instead, the shield may be directly coupled to coupler 105/mask 101.

As shown in FIG. 2, shield 102 may include a screen 217, e.g., a partially flexible and rigid plexiglass screen. When protection system 100 is worn by the user, screen 217 may at least partially surround the user's face, for example, by at least one flat front portion, and at least one curved side portions. Screen 217 may help to inhibit, minimize, or prevent air particulates or other debris from contacting a user's face. Screen 217 may also help to inhibit, minimize, or prevent air particulates exhaled by the user from entering the user's surroundings, for example, by helping to prevent exhaled air from passing forward of the user's face. As mentioned, shield 102 may further include extension 212, for example to surround a portion of the top of the user's head and/or help to prevent air particulates from reaching the user's face from above.

Referring to FIGS. 2 and 5, shield 102 may include a support system 500. Support system 500 may help to couple screen 217 to other components in protective system 100. For example, support system 500 may include left and right holders 211A and 211B and bottom holders 209A and 209B. Additionally, support system 500 may include a plurality of clips 210, and each clip may include a shield receiving portion 210C, a supporting portion 210*b*, and a holder receiving portion 210*a*. Screen 217 may be coupled to left holder 211A and right holder 211B, for example, via one or more of an adhesive, screws, bolts, etc. Holders 211A and 211B may be coupled to a bottom edge of extension 212, and may help retain screen 217 relative to other components in protective system 100. The bottom of screen 217 may be secured between holders 209A/209B and clips 210.

In some aspects, and as shown in FIG. 1, light 103 may be coupled to shield 102, for example, to a top portion of screen 217 and/or to a portion of extension 212. For example, as shown in FIG. 2, extension 212 may include a mount 218, which may support light 103. Light 103 may be electrically connected to one or more power supplies and/or controls, for example, via one or more wires 104. Wire 104 may extend along outer portions of shield 102, for example, along outer portions of screen 217 and/or extension 212. Additionally, wire 104 may be retained along the outer portions of shield 102 by one or more clips or retention mechanisms 501. Retention mechanisms 501 may include two stepped portions with an opening between, for example, to receive a portion of wire 104. As shown in FIG. 5, retention mechanisms 501 may include one or more clips, brackets, etc. Alternatively, light 103 may be battery powered, and may not include one or more wires 104. The positioning of light 103 on extension 212 may help prevent a glare from forming on screen 217, since the light emitted from light 103 does not pass through screen 217. In other examples and applications, such as in a dentist office, there are focus headlights directed to the patient. This external light could fall on the inner face of the screen if an opaque or partially-opaque barrier is not present (such as extension 212). Thus, in some embodiments, extension 212 may prevent the external light to fall on the inner face of the screen, thus preventing glare from external sources. In examples of this application, shield 102 is mounted to mask 101 in such a way that the distance between the screen and the forehead allows for wearing normal eye glasses or surgical eye glasses with magnifying lenses. The light source 103 may be mounted exterior/outside the screen to help avoid the formation of glares. Even though some existing face shields/screens may provide enough room for these type of surgical glasses, a glare may form during normal use.

Bottom holders 209A and 209B may help to support screen 217 and couple shield 102 to coupler 205. Bottom holders 209A and 209B may be pivotally coupled to coupler 205 by a linking rod 208 and connection pins 214A and 214B, for example, to allow shield 102 to pivot around the z-axis of linking rod 208. Clips 210 may each include a receiving portion 210*a* that may be positioned over a portion of bottom holders 209A and 209B. Clips 210 may each include a supporting portion 210B, for example, extending in the positive y-direction from receiving portion 210*a*, and configured to support screen 217 at a second end of screen 217.

Combined Mask/Shield

As shown in FIGS. 2 and 3, coupler 205 may include shield mounting portion 213. Shield mounting portion 213 may include one or more coupler arms, for example, two coupler arms 213*a* and 213*b*. Coupler arms 213*a* and 213*b* may be coupled to one or more connection pins 214*a* and 214*b* of bottom holders 209*a* and 209*b* and linking rod 208. Linking rod 208 may be positioned between openings 407 of coupler arms 213*a* and 213*b* of coupler 205 to help retain the components of wearable face covering 100. Linking rod 208 may have a D-shaped opening 208*a*. Connection pins 214*a* and 214*b* may also be D-shaped to fit within D-shaped opening 208*a*. In other words, openings 208*a* and connection pins 214*a* and 214*b* may have complementary shapes that prevent the relative rotation of bottom holders 209*a* and 209*b* and face shield 102. Other suitable shapes include square, rectangular, star, irregular, or the like. The friction fit between pins 214*a/b* and opening 208 may secure the bottom holders to the linking rod. Furthermore, connection pins 214*a* and 214*b* may be extended through D-shaped opening 208*a* of linking rod 208. Although only opening 407 of coupler arm 213*a* is shown in these figures, it is noted that coupler arm 213*b* may also include opening 407. Coupler arms 213*a* and 213*b* may include respective tracks 219*a* and 219*b* that each include an inward taper at each end of the track, for example, a taper of between 1 and 5 degrees, for example, approximately 3 degrees. Further, linking rod 208 may have linking pins 220*a* and 220*b* extending outwardly from linking rod 208, and the linking pins 220*a* and 220*b* are configured to travel through the tracks 219*a* and 219*b*, respectively. Inward tapers of tracks 219*a* and 219*b* may help to catch or otherwise secure linking pins 220*a* and 220*b* by friction/wedging when shield 102 is in its extreme open/closed positions. Additionally or alternatively, a latch mechanism may be used to keep shield 102 in the open and/or closed positions. Shield mounting portion 213 may help to prevent, reduce, and/or minimize unintended movement and/or rotation of shield 102.

FIG. 5 illustrates protection system 100 in a partially assembled configuration, for example, without screen 217 coupled to bottom holders 209A and 209B and left and right holders 211A and 211B and assembled support system 500. As mentioned above, one or more of left holder 211A and right holder 211B may each include a plurality of retention elements 501. Each retention element 501 may include a channel, for example, to receive wire 104 from light 103 (FIG. 1). For example, one of left holder 211A or right holder 211B may include retention elements 501, for example, for wire 104 to be coupled to left holder 211A. Alternatively, both of left holder 211A and right holder 211B may include retention elements 501, for example, for multiple wires 104 to be coupled to holders 211A and 211B, and to light 103 or for the user to have the option of coupling wire 104 to either left holder 211A or right holder 211B. Additionally, holders 211A and 211B, may each include a plurality of holes 502 to, for example, help retain screen 217, for example, with one or more of an adhesive, a bonding, a weld, one or more screws, bolts, etc. Although FIG. 5 illustrates holes 502 only in right holder 211B, it is noted that left holder 211A may also include one or more holes 502 to, for example, help retain screen 217.

As mentioned above, shield 102 may be pivotable relative to mask 101 and coupler 205. In one example, pivoting shield 102 around the z-axis of linking rod 208 may allow a user to adjust the shield to personal comfort or to the specifics of the task being performed. In other examples, pivoting the shield may allow access to the user's face, for example, to adjust, clean, or otherwise reach their glasses, clean one or more portions of mask 101 or shield 102, etc. Further, bottom holders ***209a*/*209b* may include reinforcement pins *216a*/*216b*, shown in FIG. 2, for example, to help minimize bending forces on the bottom holder 209A and 209B about the z axis during the pivoting of the shield 102**. The reinforcing pins help achieve the strengthening effect while still helping to achieve a relatively low weight of the combined shield/mask.

Figure 6A:
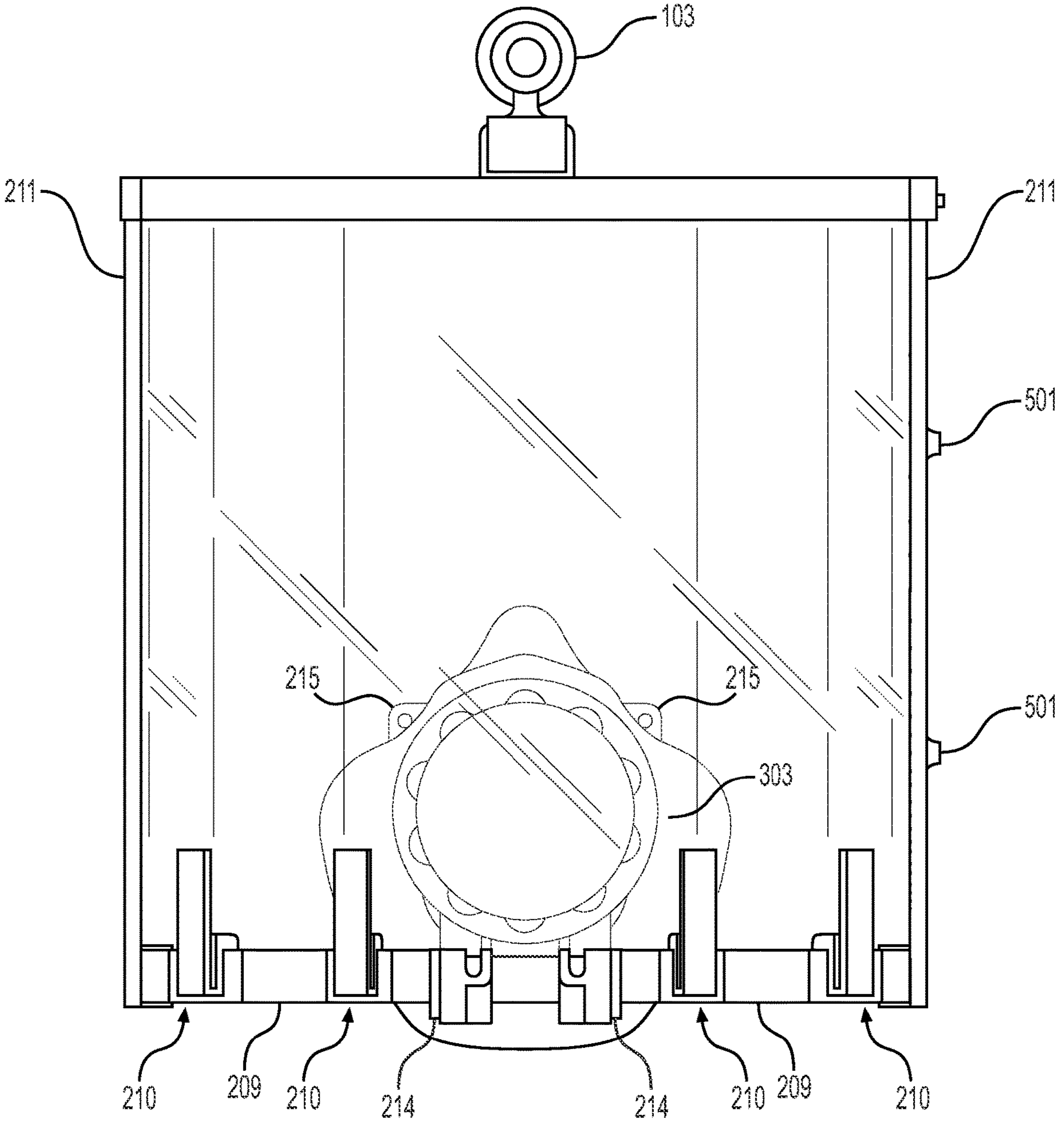
FIG. 6A illustrates a front view of the protection system of FIG. 1 in a first position.
Figure 6B:
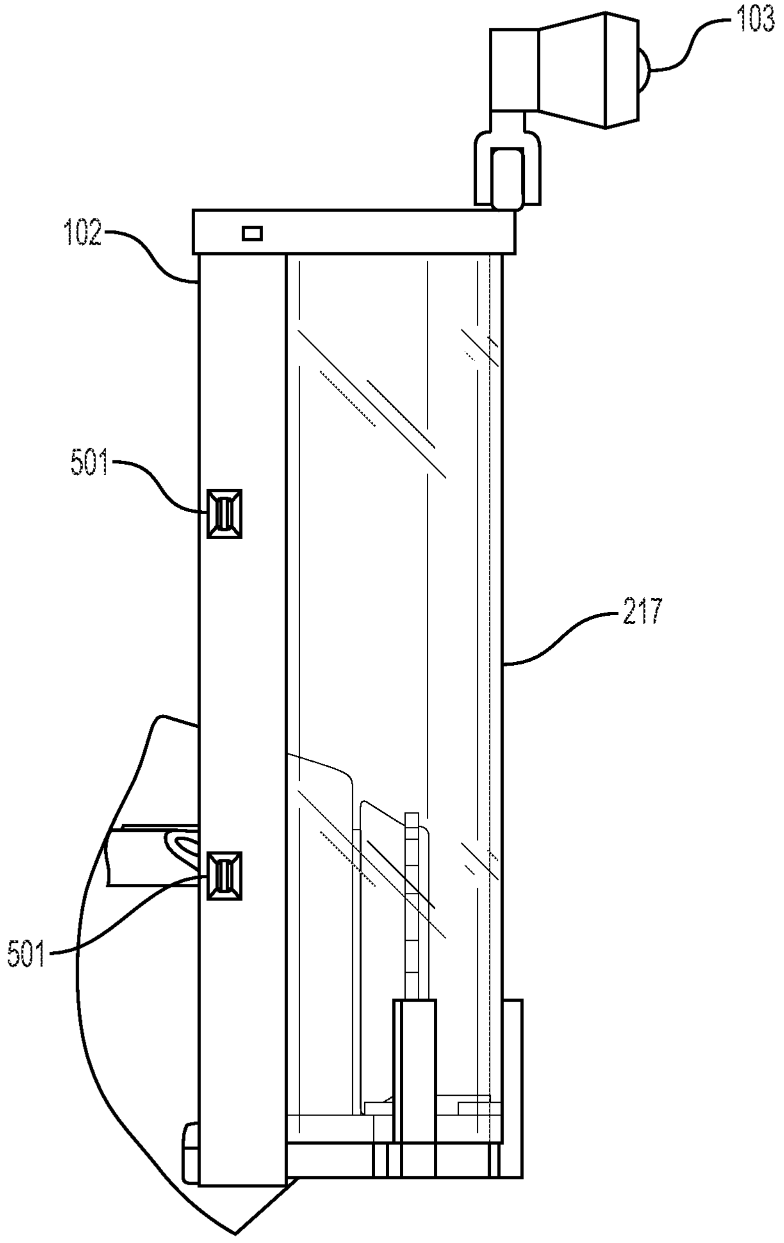
FIG. 6B illustrates a side view of the protection system of FIG. 1 in the first position.
Figure 6C:
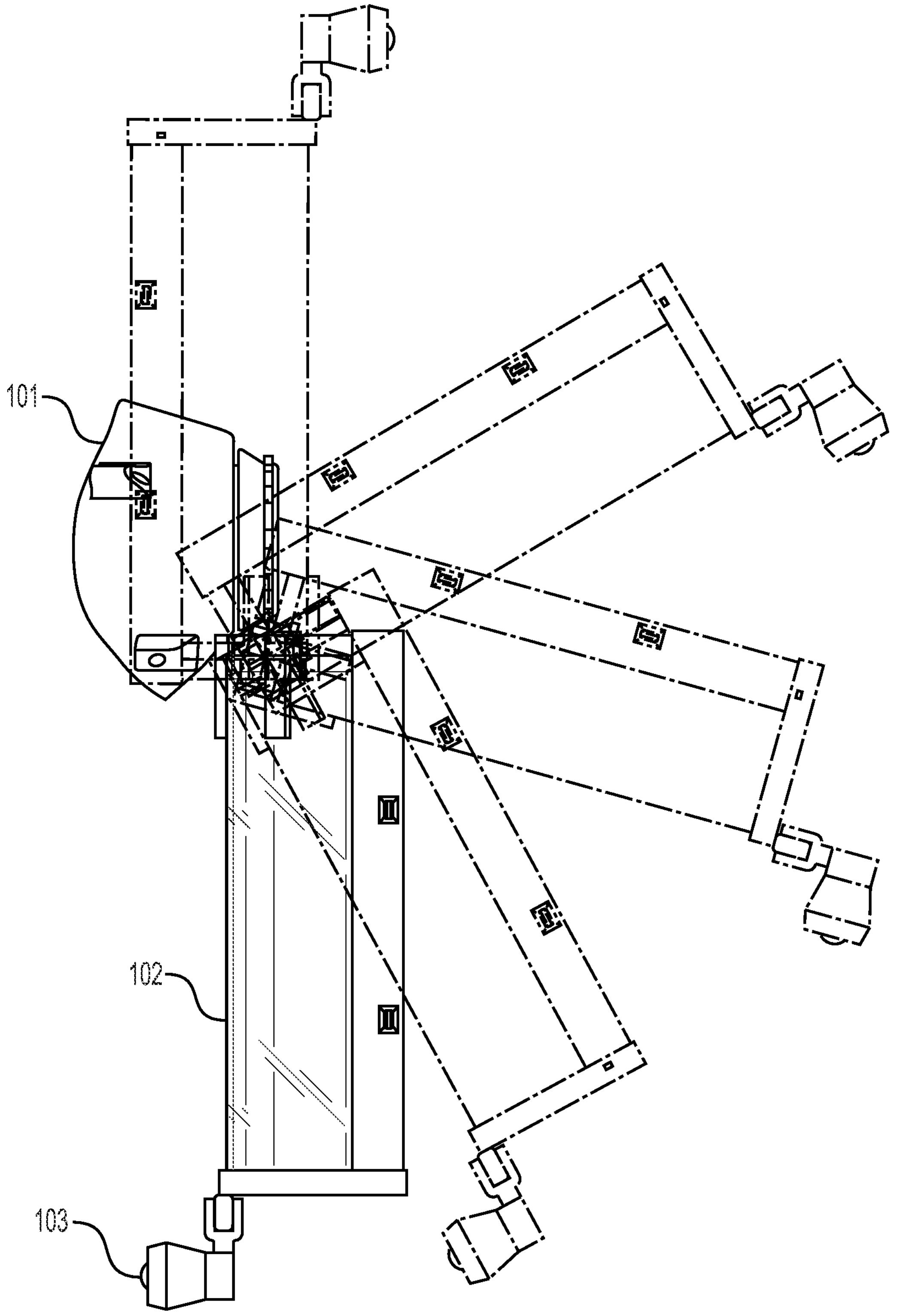
FIG. 6C illustrates a side view of the protection system of FIG. 1 in a plurality of positions.
Figure 6D:
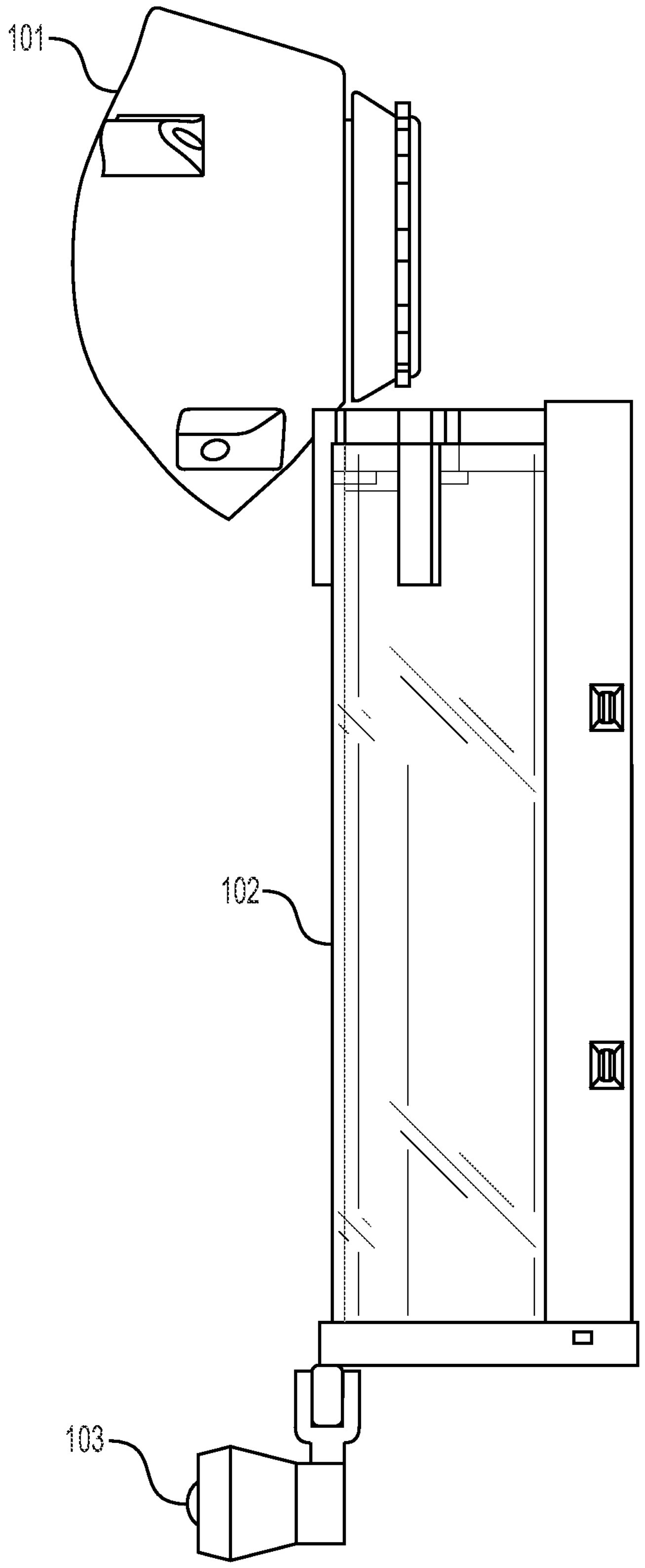
FIG. 6D illustrates a side view of the protection system of FIG. 1 in a second position.

FIGS. 6A-6D illustrate the pivoting movement of shield 102. FIG. 6A is a front view of protective system 100 in a first configuration with shield 102 in a first position relative to mask 101, and FIG. 6B is a side view of protective system 100 in the first configuration. FIG. 6C is a side view of shield 102 pivoting between a plurality of positions relative to mask 101. FIG. 6D is a side view of shield 102 in a second position relative to mask 101.

As shown in FIGS. 6A and 6B, the first position of protective system 100 is defined as shield 102 positioned adjacent to or forward of mask 101. Shield 102 may partially surround cap 207, base 203, and coupler 205. As shown in FIGS. 6C and 6D, the second position of protective system 100 is defined as shield 102 position approximately 180 degrees from the first position, thus no longer positioned adjacent to or forward of mask 101. For example, shield 102 may pivot around the z-axis of linking rod 208, as shown in FIG. 6C and as discussed above. Additionally, it is contemplated that system 100 may be configured to allow shield 102 to rotate upward relative to the mask using one or more additional linking bars. For example, in welding applications, a welding face shield may rotate over the head with a pivot at the forehead around a circular strap.

Furthermore, shield mounting portion 213 may help to secure linking pins *220a* and *220b* of linking rod 208 within tracks *219a* and *219b* to help limit and/or control movement and/or rotation of shield 102. The user may secure the shield 102 in any of the positions shown in FIG. 6C. Additionally, the user may secure the shield 102 in a user selected position not shown. Forces, not shown, such as gravity may act on shield 102 and the shield mounting portion 213, for example, to further secure/maintain the selected position. As stated before, alternatively, the user may release to allow for movement of shield 102.

As discussed above, with shield 102 in the second position shown in FIG. 6D, the user's face may be exposed. In this aspect, the user may adjust, clean, or otherwise access the user's glasses, face, etc. Additionally, with shield 102 in the second position, cap 207 may be exposed.

As mentioned earlier, base 203 may include a flexible or rigid material capable of forming around the nose and face of a user. Screen 217 may include a plexiglass, a polyester (e.g., polyester terephthalate glycol (PETG)), a polycarbonate, a vinyl, etc. Filter 204 may be a 0.3μ polypropylene based non-woven fabric (although other suitable pore sizes also are contemplated). Alternatively or additionally, filter 204 may include a polypropylene water repellent non-woven fabric. The seal 202 may include a more flexible material than the base 203. Seal 202 may include a rubber gasket, a flexible plastic, silicone, or other suitable material. Disk 206 may include a flexible plastic, a woven fabric, a rubber gasket, plexiglass, a polyester (e.g., polyester terephthalate glycol (PETG)), a polycarbonate, or a vinyl. Bottom holders 209A and 209B and/or clips 210 may include a plastic, plexiglass, a polyester (e.g., polyester terephthalate glycol (PETG)), a polycarbonate, a vinyl, etc.

Furthermore, one or more of base 203, adapter 201, coupler 205, disk 206, cap 207, bottom holders 209A and 209B, clips 210, linking rod 208, extension 212, left holder 211A, and right holder 211B may be formed via additive manufacturing or three-dimensional printing, or by other manufacturing techniques (e.g. molding, casting, extrusion, machining, or forming).

Aspects discussed herein of the disclosed protection system may help to enable a user to combine the benefits of a protective shield and a protective mask. Shield 102 may help to block, prevent, or minimize outside particulates from reaching a user's face. The user may secure shield 102 in one or more positions via locking mechanism 213. The user may be able to quickly raise and lower shield 102, for example, to access the user's face or mask 101, without removing shield 102. Further, shield 102 may support light 103 to illuminate a user's surroundings. Mask 101 may direct airflow during inhalation and exhalation. The airflow into mask 101 during an inhale may be filtered (e.g., by filter 204) to minimize the particulates that reach the user's mouth and nose during an inhale. The airflow out of mask 101 during an exhale may also be filtered to minimize the particulates that reach the user's surroundings. Mask 101 may direct airflow during exhalation rearwards, for example, away from shield 102, which may help to prevent shield 102 from fogging. Airflow may be directed rearward by the conical skirt of cap 207 directing flow towards the aligned slots 308 and venting slots 306. Furthermore, cap 207 may be separated from adapter 201, for example, to access mask disk 206 and/or filter 204, for example, to adjust, inspect, clean, replace, etc. either mask disk 206 and/or filter 204.

Mask 101, shield 102, and coupler 205 may be manufactured separately and may be assembled before or during use. For example, the user may couple mask 101, shield 102, and coupler 205 before use. Alternatively, the user may couple mask 101 and coupler 205 before use. Then, as the user is wearing mask 101 and coupler 205, the user may couple shield 102, for example, by placing shield 102 within shield receiving portion of the plurality of clips 210C, with clips 210 coupled to bottom holders 209A and 209B. Shield 102 may be replaceable. For example, the user may remove the shield 102 from shield receiving portion 210C of plurality of clips 210 by first removing extension 212 and lifting shield 102 away from shield receiving portions 210C. For example, the user may recouple a new shield using the steps listed earlier. Similarly, the shapes of mask 101 and shield 102 may vary from those shown in FIGS. 1-6D without departing from the scope of this disclosure, including for example, a substantially ovular mask instead of the shown mask or a different shaped shield. The disclosed protection system 100 may enable quick positioning of shield 102, and filtration of air by mask 101 during an inhale and exhale of user. The user may wear mask 101 without shield 102 if the user so chooses.

While principles of the present disclosure are described herein with reference to illustrative examples for particular applications, it should be understood that the disclosure is not limited thereto. Those having ordinary skill in the art and access to the teachings provided herein will recognize additional modifications, applications, embodiments, and substitution of equivalents all fall within the scope of the features described herein. Accordingly, the claimed features are not to be considered as limited by the foregoing description.

We claim:

1. A wearable face covering, comprising:
a mask, wherein the mask includes:
a base with a first central opening; and
an adapter including a coupling surface surrounding a second central opening, wherein the coupling surface extends through the first central opening of the base and includes at least one first slot in fluid communication with the second central opening;
a face shield including a partially-transparent screen;
a coupler including a venting surface surrounding a third central opening, wherein the face shield is connected to the coupler; and
a cap removably engageable with the adapter, wherein the cap is configured to prevent any gas passing through the adapter in a first direction from exiting the mask in the first direction.

2. The wearable face covering of claim 1, further comprising a filter to filter fluid passing through the second central opening.

3. The wearable face covering of claim 2, wherein the coupling surface includes an interior recessed area, and the filter is provided in the interior recessed area.

4. The wearable face covering of claim 1, wherein the adapter incudes a flange configured to abut an interior side of the base when the adapter extends through the first central opening of the base.

5. The wearable face covering of claim 1, wherein the at least one first slot has a portion that is substantially perpendicular to a central longitudinal axis of the second central opening.

6. The wearable face covering of claim 1, wherein the venting surface includes at least one second slot, and the at least one first slot is configured to align with the at least one second slot, respectively, when the adapter is extended through the third central opening.

7. The wearable face covering of claim 1, wherein the coupler includes a second flange configured to abut an exterior side of the base.

8. The wearable face covering of claim 1, wherein any gas travelling from an interior side of the base through the first central opening must pass through the second central opening before exiting the mask.

9. The wearable face covering of claim 1, wherein any gas travelling from an interior side of the base through the first central opening must pass through the third central opening before exiting the mask.

10. The wearable face covering of claim 1, wherein any gas travelling from an interior side of the base through the first central opening must pass through at least one first slot before exiting the mask.

11. The wearable face covering of claim 1, wherein:
the cap includes a center portion that is received by the third central opening of the coupler;
the center portion includes one or more openings; and
any gas travelling from an interior side of the base through the first central opening must pass through the one or more openings before exiting the mask.

12. The wearable face covering of claim 1, wherein the face shield is configured to pivot relative to the coupler at a position provided below the third central opening of the coupler.

13. The wearable face covering of claim 1, wherein the face shield is configured to pivot relative to the coupler and, when the face shield is in a first position:
a majority of a longest dimension of the screen is disposed above the mask; and
a line extending through the first central opening and perpendicular to the first central opening extends through the screen.

14. The wearable face covering of claim 13, wherein, when the face shield is in a second position:
a majority of the longest dimension of the screen is disposed below the mask; and
the line extending through the first central opening and perpendicular to the first central opening does not extend through the screen.

15. The wearable face covering of claim 1, wherein the cap includes a first protrusion and the adapter includes a first key slot configured to receive the first protrusion to couple the cap and the adapter.

16. The wearable face covering of claim 15, wherein the first key slot connects to one of the at least one first slot of the adapter, wherein after the first protrusion has traversed an entirety of the first key slot and is disposed within the one first slot, the cap and the adapter are configured to rotate relative to one another.

17. The wearable face covering of claim 1, wherein the face shield is configured to be secured to a user without any direct attachment to a head of the user.

18. A wearable face covering, comprising:
a mask, wherein the mask includes:
a base including a first opening, an interior side, and an exterior side;
an adapter including a coupling surface surrounding a second opening, wherein the coupling surface extends through the first opening of the base; and
a filter removably disposed in the adapter;
a face shield including a partially-transparent screen;
a coupler including a venting surface surrounding a third opening, wherein the face shield is connected to the coupler and also configured to pivot relative to the coupler and relative to the mask about a pivot axis disposed below the base of the mask; and
a cap removably engageable with the adapter, wherein:
the cap is configured to prevent any gas passing through the filter in a first direction from exiting the mask in the first direction, and
the cap includes a center portion that is received by the third central opening of the coupler.

19. The wearable face covering of claim 18, wherein at least one of the coupling surface or the venting surface includes at least one slot, and any gas travelling from the interior side of the base through the first opening must pass through the second central opening, the third central opening, and the at least one slot before exiting the mask.

20. A wearable face covering, comprising:
a mask, wherein the mask includes:
a base including a first opening, the base being configured to secure to a head of a user; and an adapter including a first surface defining a passage extending in a first direction, wherein the first surface is configured to extend through the first opening of the base;

a coupler including a second surface and a second opening configured to receive the first surface of the adapter;

a face shield pivotably coupled to the coupler, the face shield including a screen which is partially transparent;

one or more slots formed in at least one of the first surface or the second surface; and a cap removably engaged with the mask and configured to guide a flow of fluid inside the mask toward the one or more slots, wherein:

the screen is provided in front of the one or more slots with respect to the first direction; and the one or more slots are positioned such that fluid flowing out of the one or more slots flows in a second direction different from the first direction.

* * * * *